United States Patent
Fradkin et al.

(10) Patent No.: US 10,539,773 B2
(45) Date of Patent: *Jan. 21, 2020

(54) IMAGING SYSTEM FOR COUNTING AND SIZING PARTICLES IN FLUID-FILLED VESSELS

(71) Applicant: AMGEN INC., Thousand Oaks, CA (US)

(72) Inventors: Dmitry Fradkin, Woodland Hills, CA (US); Graham F. Milne, Ventura, CA (US); Thomas Clark Pearson, Newbury Park, CA (US)

(73) Assignee: AMGEN INC., Thousand Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/113,489

(22) Filed: Aug. 27, 2018

(65) Prior Publication Data

US 2019/0011688 A1 Jan. 10, 2019

Related U.S. Application Data

(63) Continuation of application No. 15/429,458, filed on Feb. 10, 2017, now Pat. No. 10,088,660.

(51) Int. Cl.
*G02B 21/26* (2006.01)
*G02B 21/08* (2006.01)
(Continued)

(52) U.S. Cl.
CPC .............. *G02B 21/26* (2013.01); *G02B 21/08* (2013.01); *G02B 21/361* (2013.01);
(Continued)

(58) Field of Classification Search
None
See application file for complete search history.

(56) References Cited

U.S. PATENT DOCUMENTS

| 4,136,930 A | 1/1979 | Gomm et al. |
| 5,015,094 A | 5/1991 | Oka et al. |
| (Continued) | | |

FOREIGN PATENT DOCUMENTS

| CN | 1464288 A | 12/2003 |
| CN | 1950690 A | 4/2007 |
| (Continued) | | |

OTHER PUBLICATIONS

International Application No. PCT/US2012/052914, International Search Report (ISA/EPO), dated Jan. 4, 2013, 3 pages.
(Continued)

*Primary Examiner* — Mohammad J Rahman
(74) *Attorney, Agent, or Firm* — Marshall, Gerstein & Borun LLP

(57) ABSTRACT

A system is described to facilitate the characterization of particles within a fluid contained in a vessel using an illumination system that directs source light through each vessel. One or more optical elements may be implemented to refract the source light and to illuminate the entire volume of the vessel. As the refracted source light passes through the vessel and interacts with particles suspended in the fluid, scattered light is produced and directed to an imager, while the refracted source light is diverted away from the imager to prevent the source light from drowning out the scattered light. The system can therefore advantageously utilize an imager with a large depth of field to accurately image the entire volume of fluid at the same time, facilitating the determination of the number and size of particles suspended in the fluid.

20 Claims, 6 Drawing Sheets

(51) Int. Cl.
*G02B 21/36* (2006.01)
*G06K 9/62* (2006.01)
*G06T 7/254* (2017.01)
*G06T 7/00* (2017.01)

(52) U.S. Cl.
CPC ......... *G02B 21/365* (2013.01); *G06K 9/6267* (2013.01); *G06T 7/0012* (2013.01); *G06T 7/254* (2017.01); *G06T 2207/10056* (2013.01); *G06T 2207/10064* (2013.01); *G06T 2207/20224* (2013.01); *G06T 2207/30072* (2013.01)

(56) References Cited

U.S. PATENT DOCUMENTS

| | | |
|---|---|---|
| 5,905,568 A | 5/1999 | McDowell et al. |
| 6,082,205 A | 7/2000 | Zborowski et al. |
| 6,097,428 A | 8/2000 | Wu et al. |
| 6,154,285 A | 11/2000 | Teng et al. |
| 6,252,235 B1 | 6/2001 | Niino et al. |
| 6,275,603 B1 | 8/2001 | Cronshaw et al. |
| 6,362,887 B1 | 3/2002 | Meisberger |
| 6,504,606 B2 | 1/2003 | Yagita |
| 6,833,542 B2 | 12/2004 | Wang et al. |
| 6,986,993 B2 | 1/2006 | Ghosh et al. |
| 7,430,047 B2 | 9/2008 | Budd et al. |
| 7,560,720 B2 | 7/2009 | Voigt et al. |
| 7,688,427 B2 | 3/2010 | Cox et al. |
| 7,982,868 B2 | 7/2011 | Akkerman et al. |
| 8,270,668 B2 | 9/2012 | Reinholt et al. |
| 9,418,416 B2 | 8/2016 | Milne et al. |
| 9,704,239 B1 | 7/2017 | Milne et al. |
| 9,842,408 B2 | 12/2017 | Milne et al. |
| 9,892,523 B2 | 2/2018 | Milne et al. |
| 9,922,429 B2 | 3/2018 | Milne et al. |
| 2002/0005946 A1 | 1/2002 | Oomori et al. |
| 2003/0033894 A1 | 2/2003 | Zborowski et al. |
| 2003/0086608 A1 | 5/2003 | Frost et al. |
| 2004/0146917 A1 | 7/2004 | Cork et al. |
| 2005/0068999 A1 | 3/2005 | Momiuchi et al. |
| 2005/0099687 A1 | 5/2005 | Watanabe |
| 2005/0248465 A1 | 11/2005 | Flaherty |
| 2005/0248765 A1 | 11/2005 | Budd et al. |
| 2006/0072111 A1 | 4/2006 | Budd et al. |
| 2006/0132711 A1 | 6/2006 | Iwanaga |
| 2006/0244964 A1 | 11/2006 | Cox et al. |
| 2007/0195310 A1 | 8/2007 | Kanda |
| 2008/0001104 A1 | 1/2008 | Voigt et al. |
| 2008/0226126 A1 | 9/2008 | Ohno |
| 2008/0234984 A1 | 9/2008 | Ortyn et al. |
| 2008/0291438 A1 | 11/2008 | Akkerman et al. |
| 2009/0323040 A1 | 12/2009 | Cornell et al. |
| 2010/0205139 A1 | 8/2010 | Xia et al. |
| 2010/0225913 A1 | 9/2010 | Trainer |
| 2010/0315410 A1 | 12/2010 | Zhang et al. |
| 2011/0127444 A1 | 6/2011 | Ozasa et al. |
| 2011/0268329 A1 | 11/2011 | Pronkine |
| 2013/0010283 A1 | 1/2013 | Villiger et al. |
| 2014/0177932 A1 | 6/2014 | Milne et al. |
| 2015/0160118 A1 | 6/2015 | Regelman |
| 2015/0253240 A1 | 9/2015 | Rowe et al. |
| 2016/0260513 A1 | 9/2016 | Pan et al. |
| 2016/0379376 A1 | 12/2016 | Milne et al. |
| 2016/0379377 A1 | 12/2016 | Milne et al. |
| 2016/0379378 A1 | 12/2016 | Milne et al. |
| 2017/0059471 A1 | 3/2017 | Wachemig et al. |
| 2018/0003610 A1 | 1/2018 | Tatarkiewicz |
| 2018/0120214 A1* | 5/2018 | Kato ............... G01N 15/1468 |

FOREIGN PATENT DOCUMENTS

| | | |
|---|---|---|
| CN | 101061382 A | 10/2007 |
| CN | 101126698 A | 2/2008 |
| CN | 101354241 A | 1/2009 |
| CN | 101435764 A | 5/2009 |
| CN | 101438143 A | 5/2009 |
| CN | 101561403 A | 10/2009 |
| CN | 102077143 A | 5/2011 |
| CN | 102156088 A | 8/2011 |
| CN | 102171541 A | 8/2011 |
| EP | 1847961 A1 | 10/2007 |
| EP | 2122326 A1 | 11/2009 |
| JP | 47-026198 | 10/1972 |
| JP | 55S010916 | 1/1980 |
| JP | S62220844 A | 9/1987 |
| JP | S63088431 A | 4/1988 |
| JP | H07160847 A | 6/1995 |
| JP | H08136476 A | 5/1996 |
| JP | H08305852 A | 11/1996 |
| JP | H09325122 A | 12/1997 |
| JP | H11183382 A | 7/1999 |
| JP | H11326008 A | 11/1999 |
| JP | H11513799 A | 11/1999 |
| JP | 2001116703 A | 4/2001 |
| JP | 2002107307 A | 4/2002 |
| JP | 2002267612 A | 9/2002 |
| JP | 2002340808 A | 11/2002 |
| JP | 2002357560 A | 12/2002 |
| JP | 2003270240 A | 9/2003 |
| JP | 2004028930 A | 1/2004 |
| JP | 2005121592 A | 5/2005 |
| JP | 2008508513 A | 3/2008 |
| SU | 922596 A1 | 4/1982 |
| WO | WO-2006/080355 A1 | 8/2006 |
| WO | WO-2007/138818 A1 | 12/2007 |
| WO | WO-2013/072806 A1 | 5/2013 |
| WO | WO-2015/034505 A1 | 3/2015 |

OTHER PUBLICATIONS

U.S. Appl. No. 14/241,861, Nonfinal Office Action, dated Dec. 23, 2015.
U.S. Appl. No. 14/241,861, Notice of Allowance, dated Apr. 26, 2016.
U.S. Appl. No. 14/241,861, Restriction Requirement, dated Oct. 15, 2015.
U.S. Appl. No. 15/256,429, Milne et al., filed Sep. 2, 2016.
U.S. Appl. No. 15/256,429, Nonfinal Office Action, dated Nov. 23, 2016.
U.S. Appl. No. 15/256,429, Notice of Allowance, dated Mar. 6, 2017.
U.S. Appl. No. 15/429,458, Nonfinal Office Action, dated May 12, 2017.
Wu et al., Defect recognition technique based on edge detection automatic position compensation, Modern Manufacturing Engineering, No. 5:74-6 (2004).
Mu et al., Three-dimensional particle image measurement technique based on spheroid particle-liquid two-phase flows inside round tube, Chinese J. Science Instrument, 30(5):1068-107 (2009).
Chinese patent application No. 201510481648.X, Notification of the First Office Action, dated May 4, 2017.
Singapore Patent Application No. 2014004691, Written Opinion, dated Jan. 30, 2015.
Singapore Patent Application No. 2014004691, Examination Report, dated Aug. 14, 2015.
Japanese Patent Application No. 2014-528560, Notice of Reasons for Rejection, dated May 31, 2016.
Chinese patent application No. 201280039677.5, Notification of First Office Action, dated Dec. 11, 2015.
Japanese patent application No. 2016-165451, Notice of Reasons for Rejection, dated Jun. 29, 2017.
Japanese patent application No. 2016-165450, Notice of Reasons for Rejection, dated Jun. 29, 2017.
Canadian Patent Application No. 2,843,016, Examination Report, dated Jun. 27, 2017.
U.S. Appl. No. 15/192,920, Nonfinal Office Action, dated Jun. 7, 2017.
U.S. Appl. No. 15/192,920, Notice of Allowance, dated Aug. 28, 2017.

(56) References Cited

OTHER PUBLICATIONS

International Application No. PCT/US2017/017302, International Search Report and Written Opinion, dated Oct. 11, 2017.
Eurasian patent application No. 201490169/31, Examination Report, dated Nov. 19, 2015.
Eurasian patent application No. 201490169/31, Examination Report No. 2, dated Jul. 27, 2016.
Eurasian patent application No. 201490169/31, Notice of Allowance, dated Jan. 31, 2017.
Taiwan Patent Application No. 101131282, Search Report, dated May 11, 2016.
Taiwan Patent Application No. 101131282, Office Action, dated May 16, 2016.
Australian patent application No. 2012302036, Examination Report No. 3, dated Aug. 31, 2015.
Australian patent application No. 2012302036, Examination Report No. 2, dated May 30, 2015.
Australian patent application No. 2012302036, Examination Report No. 1, dated Feb. 6, 2015.
Australian patent application No. 2016100220, Innovation Patent Examination Report No. 1, dated Jun. 24, 2016.
U.S. Appl. No. 15/193,704, Nonfinal Office Action, dated Aug. 23, 2017.
Israeli Patent Application No. 248337, Notification of Defects, dated Jun. 10, 2018.
Singapore Patent Application No. 10201606760T, Search Report and Written Opinion, dated Mar. 7, 2018.
Soloff et al., Distortion compensation for generalized stereoscopic particle image velocimetry, Meas. Sci. Technol. 8:1441 (1997).

\* cited by examiner

IMAGING SYSTEM FOR COUNTING AND SIZING PARTICLES IN FLUID-FILLED VESSELS

CROSS-REFERENCE TO RELATED APPLICATION

This is a continuation of U.S. patent application Ser. No. 15/429,458, entitled "Imaging System for Counting And Sizing Particles In Fluid-Filled Vessels" and filed on Feb. 10, 2017, the entire disclosure of which is hereby incorporated by reference herein.

FIELD OF THE DISCLOSURE

The present application relates generally to particle detection in fluid-filled vessels.

BACKGROUND

In analytical research and clinical diagnostic testing, vessels, or wells, in plates are used as test tubes. The fluid contained in these wells may intentionally or unintentionally contain particles in a variety of different shapes and sizes. Unintentional particles can originate from a number of different sources, such as from the environment, from incorrect handling or storage of the fluids, or as a residual from forming, packaging, or filling. The fluid can also contain bubbles. As a result, the fluid contained in the vessels is subjected to quality control procedures in which particles contained in the fluid need to be characterized.

Traditional plate-reading systems are incapable of imaging large volumes of fluid at once. For example, conventional plate-reading systems may rely on fluorescence techniques or optical components that utilize microscope objectives. When microscope objectives are implemented, only a thin volume or "slice" of sample fluid can be imaged at any given time given the short field of view that is inherent with such systems. Thus, to analyze an entire volume of fluid, such systems need to analyze several obtained image slices for each vessel, which increases the time required to perform image analyses.

SUMMARY OF THE DISCLOSURE

Embodiments described herein are directed to a plate-reading system that improves upon the traditional indirect measurement techniques described above. In particular, the system described herein implements an illumination system including optics configured to refract source light and to direct the refracted source light through a well containing a fluid. This refracted source light interacts with particles suspended in the fluid to produce scattered light, which is then directed to an imager. The illumination system is configured in such a manner that the refracted source light is also diverted away from the imager. In other words, a substantial amount of light received by the imager, which is used for particle image analysis, is the scattered light. This illumination system prevents the source light from washing out the scattered light, providing a large depth of field and allowing accurate imaging of the entire volume of fluid at the same time.

The plate-reading system described herein also agitates momentarily to facilitate image analysis. In particular, the imager may capture an image before and after the plate is agitated. In doing so, the image analysis discriminates between particles suspended in the fluid (which move when the plate is agitated) and other static artifacts (which do not move after plate agitation). As a result of this image analysis, the size and number of particles suspended in the fluid may be directly measured.

BRIEF DESCRIPTION OF THE DRAWINGS

The skilled artisan will understand that the figures, described herein, are included for purposes of illustration and are not limiting on the present disclosure. The drawings are not necessarily to scale, emphasis instead being placed upon illustrating the principles of the present disclosure. It is to be understood that, in some instances, various aspects of the described implementations may be shown exaggerated or enlarged to facilitate an understanding of the described implementations. In the drawings, like reference characters throughout the various drawings generally refer to functionally similar and/or structurally similar components.

DETAILED DESCRIPTION

The various concepts introduced above and discussed in greater detail below may be implemented in any of numerous ways, and the described concepts are not limited to any particular manner of implementation. Examples of implementations are provided for illustrative purposes.

Figure 1:
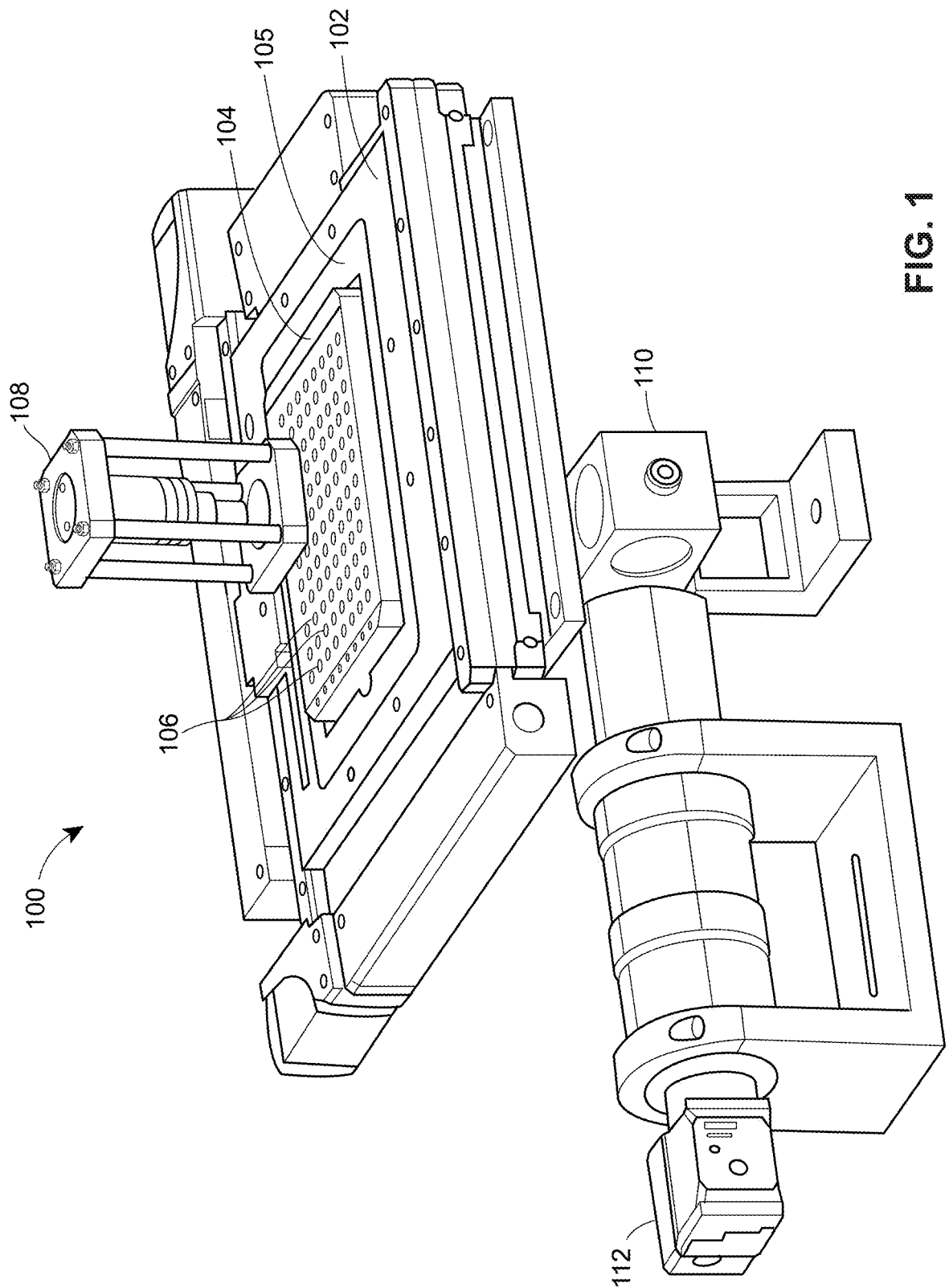
FIG. 1 illustrates a visual inspection system 100, according to an embodiment of the present disclosure.

FIG. 1 illustrates a visual inspection system 100, according to an embodiment of the present disclosure. The visual inspection system 100 includes a stage 102 that is configured to selectively agitate and to receive a plate 104, which may include one or more vessels 106. In an embodiment, the stage 102 includes a plate holder 105 that functions as an adaptor between the stage 102 and the plate 104 to facilitate receipt of the plate 104 for vessel fluid imaging. Although stage 102 is shown in FIG. 1 as receiving a single type of plate holder 105, embodiments include stage 102 being configured to accept any suitable number of plate holders having varying sizes and/or shapes. For example, stage 102 may be configured having several nested, adjustable, and/or interchangeable cavities or other suitable formed parts that accept different types of plate holders. In this way, visual inspection system 100 may facilitate the testing of vessels included in plates of different types, sizes, and/or shapes. The design of plate holder 105 is further discussed below with reference to FIG. 6.

In various embodiments, vessels 106 may have one or more transparent and/or opaque portions. For example, vessels 106 may be entirely transparent or have transparent bottoms with the side walls being opaque. In any event, the visual inspection system 100 further includes an illumination system 108 that is configured to illuminate the fluid contained in the one or more vessels 106 held by the stage 102, one or more imagers 112 that acquire images of the fluid contained within the one or more vessels 106 before and after vessel 106 is agitated, and may optionally include an optical system 110. The stage 102 and/or the illumination system 108 may also be configured to move in one or more axes to accommodate the inspection of each vessel 106 included in plate 104 and to accommodate the testing of different sizes of plates and vessels.

Additional detail regarding the components of the visual inspection system 100 is provided below. As an overview, the visual inspection system 100 is configured to image the fluid contained in one or more vessels 106 in an iterative manner. For example, visual inspection system 100 may be configured to iteratively image each vessel 106 included in the plate 104 to identify, for each individual vessel, particles suspended in the fluid for that particular vessel. To do so, visual inspection system 100 is configured to move stage 102 and/or illumination system 110 to align each vessel 106 with the illumination system 108 for individual vessel analysis. As each vessel is tested, one or more images of the vessel are acquired before and after the stage 102 is agitated in accordance with an agitation profile, as further discussed below. Thus, in some embodiments, one or more agitators (not shown) is coupled directly or indirectly to the stage 102.

The illumination system 108 also includes one or more optical elements. As used herein, the term "optical elements" may apply to a single optical component individually or a combination of several optical components. For example, an optical element may include one or more single axicons, lenses, beam expanders, mirrors, etc. To provide another example, an optical element may include a combination of one or more axicons, lenses, beam expanders, mirrors, etc. In any event, illumination system 108 may include an optical element that is configured to refract source light into the vessel 106. The refracted source light interacts with particles suspended in the vessel's fluid to produce scattered light, which is received by the imager and used to acquire the one or more images before and after agitation. Illumination system 108 is also configured to refract the source light in such a way that the refracted source light is diverted away from the one or more imagers 112, thereby preventing the source light from washing out the scattered light and facilitating accurate characterization of the individual particles contained in the vessel's fluid. For example, particle characteristics that may be determined via the various embodiments described herein include the number and/or size of particles, particle morphology, density/buoyancy, etc.

The visual inspection system 100 analyzes one or more of the images acquired before and after the agitation of stage 102 to determine if particles are present in the fluid contained in the vessel 106. The one or more images may further be analyzed to count a number of particles present, to size particles, to track particle movement, or to characterize or classify particles. Particles may be, for example, dust or other contaminants, or protein aggregates. In the present disclosure, particles are discussed; however, it is to be understood that the concepts of the present disclosure also apply to bubbles or emulsions.

The agitation profile includes one or more agitation and non-agitation periods. During each agitation and non-agitation period of the agitation profile, a motion is applied to the vessel and is discontinued, respectively. For example, the agitation profile may include a motion in an agitation period followed by the motion being discontinued for a non-agitation period. The discontinuation of a motion may or may not include applying a force to the stage 102 to counteract the motion, such as applying a braking force. A braking force may be, for example, a friction force. The agitation and the non-agitation period may be the same time periods or different time periods depending on the particular fluid being tested. A motion may be shaking, vibration, spinning, applying ultrasonic energy, applying acoustic energy, flipping, another motion, or any suitable combination thereof. For example, assuming that the stage 102 occupies the x-y plane, an agitation motion may be a side-to-side motion of 1 millimeter in the x-axis followed by an up-and-down motion of 1 millimeter in the y-axis, each of which may occur for 100 milliseconds followed by a non-agitation period of 100 milliseconds.

Referring now back to FIG. 1, visual inspection system 100 may be configured to test any suitable number of vessels 106 having any suitable volume of fluid contained therein. Thus, in embodiments, the plate 104 may be any suitable size and/or shape having any suitable number of vessels 106 disposed thereon. For example, plate 104 may be a microplate including any suitable number of vessels 106, such as 6, 24, 96, 384, 1536, etc. The vessels 106 may be arranged in a pattern on the plate 104, such as a 2:3 rectangular matrix, for example, in the case of a standard microplate implementation. In embodiments in which plate 104 is implemented as a microplate, vessels 106 may constitute wells on the microplate that contain a fluid to be inspected. Each vessel 106 may be configured to receive any suitable volume of fluid depending on the size and configuration of plate 104. For example, each vessel 106 may hold a volume of fluid in the range of tens of nanoliters up to several milliliters. For example, when plate 104 is implemented as a 96-well microplate, each vessel may hold a volume up to 200 microliters.

Figure 2:
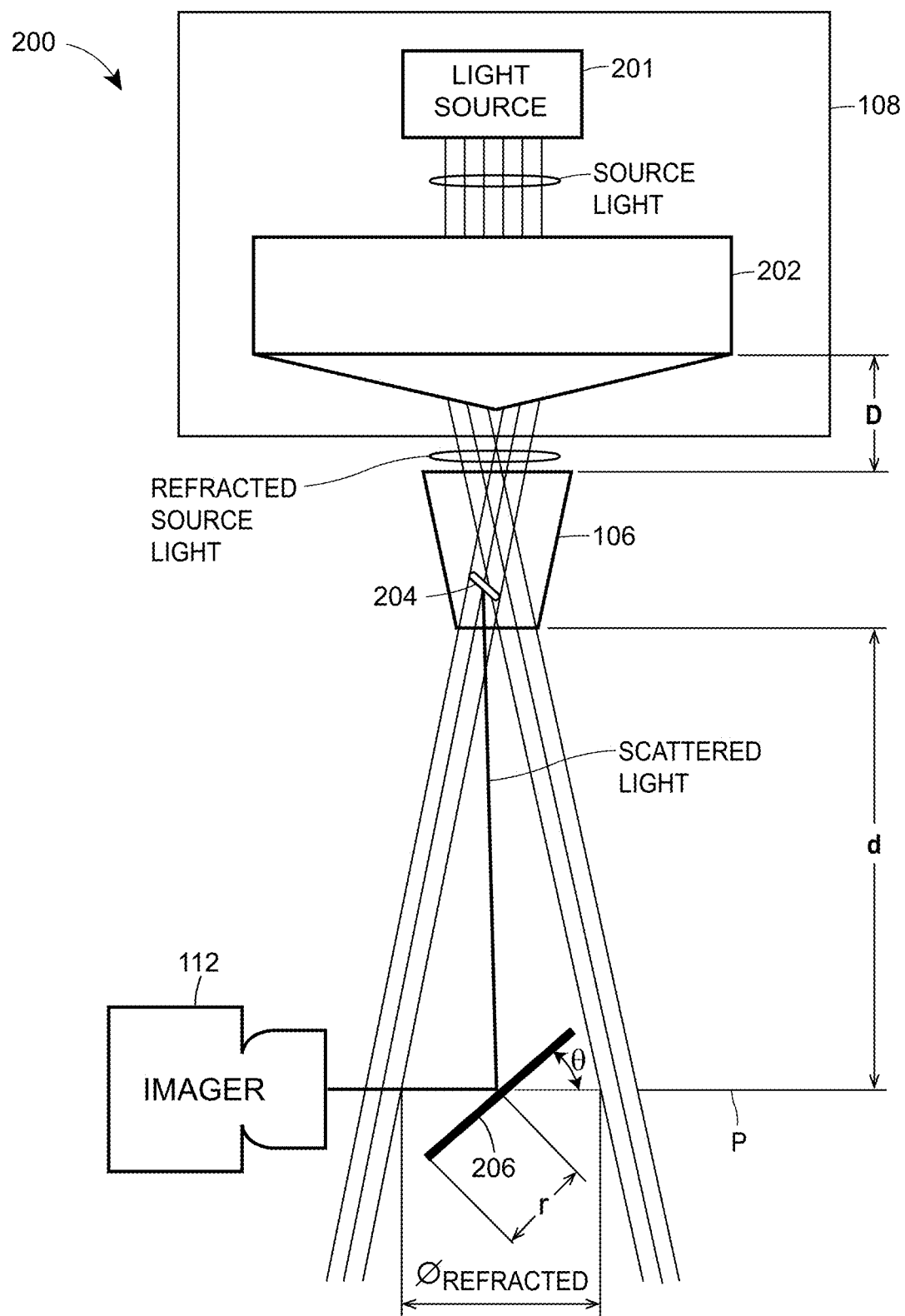
FIG. 2 is a block diagram 200 illustrating light paths between a light source and an imager that are associated with visual inspection system 100, according to an embodiment of the present disclosure.

Visual inspection system 100 includes an illumination system 108, which may include any suitable number and/or type of light sources configured to generate source light. Illumination system 108 also includes one or more optical elements configured to refract the source light such that the source light is directed through the vessel 106 at an angle. This is particularly useful, for example, because the particles suspended in the fluid may be translucent, and this ensures that the particles scatter the source light to produce scattered light for proper imaging. If the source light is not refracted, and is instead provided in a manner that is aligned with the vessel's center axis, such translucent particles would not scatter the source light to provide scattered light that can be effectively used for imaging. An example of the optical characteristics provided by illumination system 108 are shown in FIG. 2 with reference to the example embodiment of visual inspection system 100 shown in FIG. 1. However, it will be understood that visual inspection system 100 and/or illumination system 108 may be implemented in a variety of different configurations and with different components to facilitate the embodiments described herein, as further discussed below.

With continued reference to FIGS. 1 and 2, illumination system 108 may include one or more light sources 201, which may include any suitable type of light source configured to generate source light having any suitable wavelength or range of wavelengths. For example, light source 201 may be implemented as a light-emitting diode (LED) light source configured to produce source light at a single wavelength, a selectable range of wavelengths, or a wide band of wavelengths. To provide an illustrative example, the light source 201 may be implemented as an LED light source configured to provide source light over a wide range of wavelengths, with a particular wavelength or range of wavelengths being selected from within the wide range of wavelengths for vessel imaging.

In embodiments, illumination system 108 also includes one or more optical elements configured to refract the source light into the vessel 106 and towards imager 112 in a specific manner, as shown in FIG. 2 and further discussed below. In particular, embodiments include illumination system 108 implementing any suitable number and/or type of axicons, individual optical lenses, a train of lenses, etc., configured to refract the source light such that the refracted source light enters the vessel under test at an angle with respect to the vessel's center axis. The particles suspended in the vessel's fluid then scatter the refracted source light, which is provided to imager 112 while the refracted source light is largely (or entirely) diverted away from the imager 112.

In an embodiment, to realize the aforementioned optical characteristics, illumination system 108 may include an axicon 202 or other suitable type of optical element configured to refract the source light to ensure that the entire volume of fluid contained in the vessel 106 is properly illuminated for imaging. For example, axicon 202 may be selected having a suitable cone angle to refract the source light such that, for a given distance "D" from the vessel 106, the entire volume of fluid contained in the vessel 106 is properly illuminated for imaging. In an embodiment, axicon 202 may be implemented as an axicon having a 90 degree apex angle and a 1" diameter, such as axicon stock number 83-779, which is manufactured by Edmund Optics, Inc. of Barrington, N.J. at the time of this writing.

When using axicon 202, it is preferable that light source 201 not be implemented as a laser light source or other light source configured to generate coherent light, as coherent light passing through an axicon results in the generation of interference patterns known as Bessel beams, which are undesirable for imaging vessel 106. In contrast, it is preferable that the light source 202 generate incoherent source light when axicon 202 is used as the optical element.

Furthermore, a mirror 206 or other suitable optical component may be strategically sized and placed with respect to the vessel 106 to direct the scattered light to imager 112 while diverting the refracted source light away from the imager 112. For example, mirror 206 may be placed in line with the center axis of vessel 106, light source 201, and axicon 202, as shown from the side view illustrated in FIG. 2. In an embodiment, mirror 206 is disposed a distance from the bottom of vessel 106 to reflect the scattered light to imager 112. Moreover, mirror 206 may be sized such that the refracted source light is not reflected by mirror 206, and is instead diverted away from the imager 112.

To provide an illustrative example with reference to FIG. 2, mirror 206 may be a circular mirror having a radius "r," with its center disposed a distance "d" from the bottom of vessel 106. As shown in FIG. 2, axicon 202 refracts the source light through the vessel 106 to illuminate the vessel for fluid imaging. For a particular refractive index of axicon 202 (e.g., caused by the axicon's conical angle and its composition) and distance D between the axicon 202 and the vessel 106, the refracted source light forms a cone of refracted light having a diameter $\emptyset_{REFRACTED}$ in the plane "p" that intersects the center of the mirror 206 and is orthogonal to the center axis of vessel 106. Moreover, the scattered light is contained within this cone of refracted light. In embodiments, mirror 206 may have a radius r, be placed a distance d from the bottom of vessel 106, and be positioned at an angle θ from the plane p such that 2r cos θ<$\emptyset_{REFRACTED}$. Given these parameters, the scattered light is directed towards the imager 112 while the cone of refracted light is diverted away from the imager 112. For example, as shown in FIG. 2, the imager 112 and the vessel 106 may be placed at 90 degrees with respect to one another, and the mirror 206 may thus form an angle θ of 45 degrees with respect to the center axis of vessel 106.

Without diverting the retracted source light in this manner, it would drown out the scattered light and prevent proper imaging analysis of the fluid contained in the vessel. An example of such an arrangement is shown in FIG. 2 with a single particle 204. However, it will be understood that the fluid contained in the vessel 106 may include any number of particles or bubbles, each scattering the refracted source light, with the scattered light from each particle being received by the imager 112.

Due to the refraction of the source light in this way, illumination system 108 provides light with a high degree of intensity to any particles that are suspended in the fluid contained in vessel 106. In doing so, imager 112 may implement a smaller aperture on its main camera lens, thus achieving a larger depth of field than is possible in conventional well-plate inspection systems. In various embodiments, imager 112 uses a telecentric lens that implements an aperture size of f/6 or smaller, and preferably between f/8 to f/11 for light source 201 being approximately 3 Watts. As the aperture size is dependent upon the light source brightness, higher power light sources may allow for even smaller aperture sizes than f/11. Traditional well plate imagers, on the other hand, typically implement aperture sizes around f/2 to f/2.8, which yields a very narrow depth of field.

This advantageously allows for all particles present in the fluid to be in focus and analyzed at the same time, i.e., by capturing and analyzing images of the entire contents of vessel 106. This is in contrast to typical microscopy techniques, whereby depth slices of the vessel's fluid need to be obtained to properly image larger fluid volumes, as the imager's main camera lens aperture needs to be opened to improve visibility. In this way, illumination system 108 allows the number and size of the particles in the entire volume of fluid contained in vessel 106 to be characterized via image analysis at the same time.

In various embodiments, the position of the axicon 202 or other suitable optical element in relation to the vessel 106 may be fixed or adjustable. For example, the axicon 202 may be mounted within illumination system 108 at a fixed position. Illumination system 108 may then be disposed a distance above the stage 102 such that the axicon 202 is offset a desired distance "D" from the vessel 106, as shown in FIG. 2, to ensure the proper optical characteristics for image analysis depending on the dimensions of the vessel (or plate) being tested, the characteristics of the optical element (e.g., axicon 202).

To provide an illustrative example, if the plate 104 is a 96-well microplate, then each vessel 106 may have standard dimensions such as height and diameter. Furthermore, axicon 202 may be selected having a 90 degree apex angle and a 1" diameter. Thus, the axicon 202 and the illumination system 108 may be disposed to provide a distance D of 12 mm between the axicon 202 and the vessel 106 to ensure the desired optical characteristics as shown in FIG. 2. Such embodiments may be particularly useful, for example, when visual inspection system 100 is utilized to test a single type of plate having vessels with known, predetermined dimensions. Of course, for other types of optical elements and vessel sizes, the distance D may be greater than or less than 12 mm to ensure the proper optical characteristics, i.e., that the source light is diverted from the imager 112 while illuminating the entire volume of fluid in vessel 106.

However, illumination system 108 may also be configured to test a variety of different plate types, which have different vessel sizes. To provide another illustrative example, plate 104 may include 96-well microplates for one testing configuration and 24-well microplates for another. Continuing this example, vessels included in a 24-well microplate have a larger height and diameter than vessels included in a 96-well microplate. Therefore, the optical characteristics resulting from the axicon 202 being offset a distance D from the vessel 106 may provide desirable optical characteristics for a 96-well microplate, but not for a 24-well microplate. There are several embodiments of visual inspection system 100 to address such issues.

For example, embodiments include illumination system 108 being implemented as one of several modular components, with each modular component being used for each different type of plate being tested. For instance, different modular implementations of illumination system 108 may include the axicon 202 being disposed at different locations within the illumination system 108, resulting in different distances D for different modular illumination systems 108 disposed the same distance above the stage 102. To provide another example, different modular illumination systems 108 may have axicons with different conical angles, resulting in refracting the source light at different angles in each case.

Additionally or alternatively, stage 102 may include one or more receptacles, fasteners, etc., positioned to define various preset distances D between the axicon 202 and the vessel 106 for different modular implementations of illumination system 108. In this way, different modular implementations of illumination system 108 may be swapped out depending on the particular type of plate being tested to ensure that the desired optical characteristics are maintained for different sizes and shapes of vessel 106.

In other embodiments, illumination system 108 may be a single design with the distance D being adjustable. Using the previous example, when testing a 24-well microplate, the axicon 202 may need to be placed a distance D1 from the vessel 106. However, when testing a 96-well microplate, the axicon 202 may need to be placed a different distance D2 from the vessel 106. Although two different modular designs of illumination system 108 could address this issue, it may be preferable to have a universal adjustable design to facilitate the testing of different plate types. Thus, embodiments include illumination system 108 being configured such that the distance D is adjustable. In still further embodiments, the stage 102 may be configured to move in the x-, y-, and z-axes to allow adjustment of the distance D in addition to aligning each vessel 106 with the illumination system 108 while being tested.

In still additional embodiments, other optical components may be implemented in conjunction with axicon 202 or another optical element, as the case may be, to provide another technique for adjusting the optical properties of illumination system 108. For example, illumination system 108 may include one or more beam expanders disposed between the light source 201 and the axicon 202, which are configured to vary the or "tune" the diameter of the beam illuminating the beak of axicon 202 (i.e., before the source light is refracted). In other words, embodiments include varying the diameter of the source light entering the axicon 202 and the axicon cone angle to adjust the illumination of the fluid in vessel 106. Thus, the position and/or type of such optical components may also be varied among different modular designs of illumination system 108, as discussed herein.

In any event, to facilitate such adjustments, embodiments include the stage 102, the illumination system 108, the axicon 202 and/or other optical components implemented by illumination system 108 being movably mounted within visual inspection system 100. For example, the illumination system 108 and/or the axicon 202 may be mounted to a linear actuator or other suitable drive mechanism to allow a desired distance D to be obtained depending on the type of plate 104 being tested. To provide another example, the stage 102 may include one or more linear actuators or other suitable drive mechanisms to allow displacement in the z-axis to adjust the distance D depending on the type of plate 104 being tested. In this way, the positions of one or more of the stage 102, the illumination system 108, and/or the axicon 202 may be adjusted to ensure that the desired optical characteristics are maintained for proper imaging when testing vessels having different sizes and shapes.

Regardless of the particular implementation of illumination system 108, embodiments include the source light 201 being directed downwards into the top of each vessel 106 to facilitate imaging the entirety of the fluid contained in the vessel 106 being tested. Again, to do so, the light that is scattered from particles suspended in the fluid may be directed to imager 112 while the refracted source light is diverted away from the imager 112. In some embodiments, imager 112 may receive the scattered light via optical system 110, as shown in FIGS. 1 and 2. However, optical system 110 is an optional component of visual inspection system 100, and may not be present in other embodiments. For example, as shown in FIG. 1, optical system 110 may be positioned beneath stage 102 and include one or more mirrors, lenses, etc. (e.g., mirror 206, as shown in FIG. 2) configured to reflect the light scattered from the suspended particles to imager 112. In this way, optical system 110 may facilitate imager 112 being positioned along a separate axis than that of illumination system 108, allowing for additional design flexibility.

In other embodiments, illumination system 108 may be configured to illuminate the volume of fluid contained in vessel 106 by providing source light from the side of the vessel 106. To do so, illumination system 108 may include an additional optical system, such as optical waveguides, for example, that direct the light provided by light source 201 to illuminate the vessel 106 from the side. This optical system is not shown in FIGS. 1-2 for purposes of brevity, but may include any suitable combination of light sources, optical elements, waveguides, etc., configured to provide scattered light to imager 112 while diverting the source light from the imager 112. For example, an optical sub with optical waveguides may be integrated as part of the plate being tested or as part of the stage 102, and light source 201 may be disposed within visual inspection system 100 to provide full illumination of each vessel as it is tested.

In still other embodiments, illumination system 108 and imager 112 may be aligned along the same axis, thereby eliminating the need for optical system 110. For example, imager 112 may be mounted beneath stage 102 in place of optical system 110, receiving the scattered light directly as it exits the bottom of vessel 106. Of course, such implementations may be accompanied by spacing the imager 112 a distance beneath stage 102 to ensure that the scattered light is received by the imager 112 while the refracted source light is mostly (or entirely) diverted from the imager 112.

In various embodiments, imager 112 is configured to capture one or more images and/or video over one or more consecutive frames. For example, imager 112 may selectively capture images and/or video at specific times in response to commands received from a controller, which is further discussed below with reference to FIG. 3. The imager 112 may capture the images and/or video in a manner that is synchronized with the agitation of stage 102, allowing the controller to analyze images at specific times prior to and after the agitation of stage 102 (and thus the agitation of fluid contained in vessel 106). When video is captured, embodiments include the controller extracting video frames that correspond to desired time periods, e.g., prior to and after the agitation of stage 102.

Imager 112 may include any suitable combination of hardware and/or software to facilitate this functionality, such as image sensors, optical stabilizers, image buffers, frame buffers, frame grabbers, charge-coupled devices (CCDs), complementary metal oxide semiconductor (CMOS) devices, etc. Furthermore, imager 112 may include one or more telecentric lenses to provide image magnification of the vessel 106 that is independent of the vessel's distance or position in the field of view. Moreover, imager 112 may communicate with the controller (as discussed below with reference to FIG. 3), and store acquired images and/or video for image analysis to the controller for image analysis. Alternatively, imager 112 may store the images and/or video locally in any suitable type of memory, and this memory may be accessed by a controller for image analysis. To provide another example, imager 112 may be implemented as a "smart camera," with image processing logic built into the camera using any suitable techniques, such as field programmable gate array (FPGA) technologies, for example. To provide yet another example, imager 112 may be implemented as part of a plenoptic 3D camera system.

Although a single imager 112 is shown in FIGS. 1-2, embodiments of visual inspection system 100 may include multiple imagers 112 to acquire images of the vessel under test from different locations. Such embodiments may be particularly useful, for example, to implement faster parallel imaging, for wide angle versus narrow angle imaging, for small area versus large area imaging, for color versus infrared imaging, and so forth. To facilitate this functionality, optical system 110 may be configured with optical components (e.g., beam splitters, optical waveguides, etc.) to split the scattered light from the vessel under test such that each individual imager 112 receives the same scattered light. Such embodiments may be particularly useful, for example, when multiple image analyses need to be performed for the same vessel under test, allowing several images to be captured and imaged in parallel.

Figure 3:
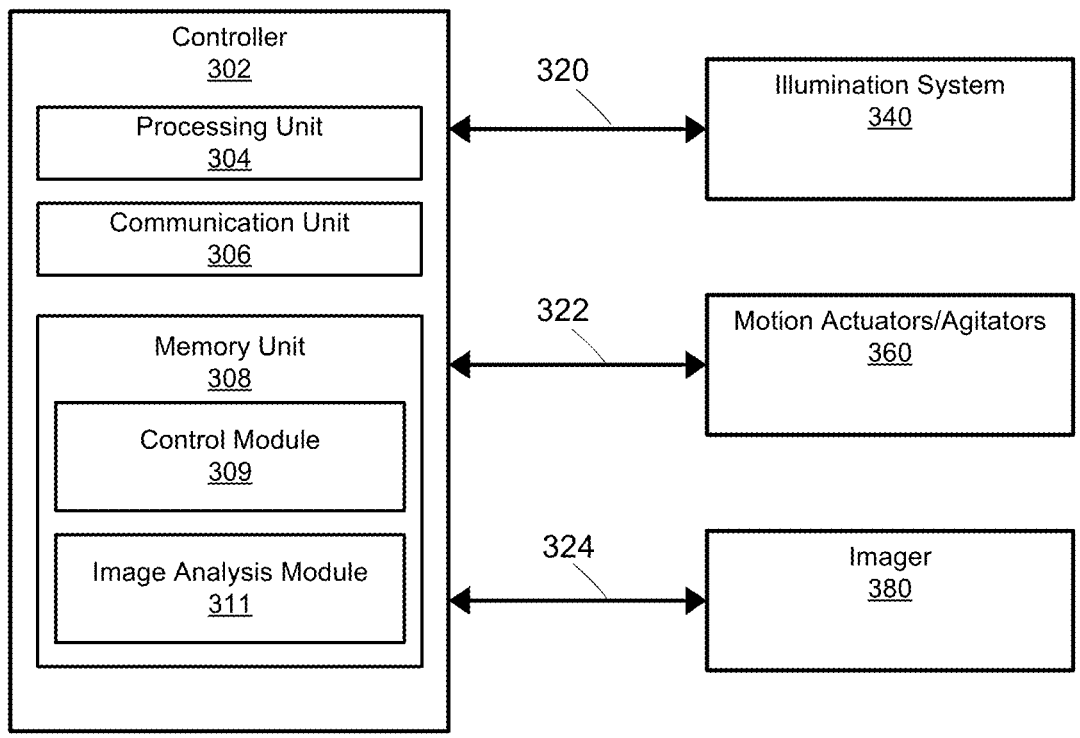
FIG. 3 is a block diagram example illustrating a control system 300 associated with visual inspection system 100, according to an embodiment of the present disclosure.

FIG. 3 is a block diagram example illustrating a control system 300 associated with visual inspection system 100, according to an embodiment of the present disclosure. As further discussed below, control system 300 may include a controller 302 that is configured to communicate with and control various components of visual inspection system 100, such as illumination system 340, motion actuators/agitators 360, and/or imager 380, for example. Furthermore, in an embodiment, control system 300 is configured to facilitate fully autonomous or semi-autonomous operation of visual inspection system 100. To do so, control system 300 may support the automatic analysis of a number of vessels that are included on a plate to determine a number and/or size of particles contained in the fluid of each vessel.

In an embodiment, illumination system 340 and imager 360 may be an implementation of illumination system 108 and imager 112, respectively, as discussed herein with respect to FIGS. 1-2. Furthermore, motion actuators/agitators 360 may represent one or more motors, servos, actuators (e.g., piezo actuators), etc., associated with one or more components of visual inspection system 100. For example, motion actuators/agitators 360 may include linear actuators associated described above that may enable adjustments to be made to the position of the stage 102, the axicon 202, and/or the illumination system 108. To provide another example, motion actuators/agitators 360 may include one or more agitators configured to agitate stage 102.

Controller 302 may be implemented, for example, as any suitable combination of hardware and/or software coupled to or otherwise in communication with illumination system 340, motion actuators/agitators 360, and/or imager 380. For example, controller 302 may be implemented as device mounted to or integrated as part of stage 102, or controller 302 may be located remote from visual inspection system 100. In any event, controller 302 may be coupled to one or more of illumination system 340, motion actuators/agitators 360, and/or imager 380 via wired links, wireless links, or any suitable combination thereof. Therefore, links 320, 322, and/or 324 may represent one or more wired and/or wireless links to facilitate communications between controller 302 and one or more of illumination system 340, motion actuators/agitators 360, and/or imager 380. Although three separate links 320, 322, and 324 are shown in FIG. 3, it will be understood that controller 302 may communicate with one or more of illumination system 340, motion actuators/agitators 360, and/or imager 380 via any suitable number of links, including a single shared link.

To facilitate communication with and control of these components, controller 302 may include a processing unit 304, a communication unit 306, and a memory unit 308. Processing unit 304 may be implemented as any suitable type and/or number of processors, such as a host processor of controller 302, for example. To provide additional examples, processing unit 304 may be implemented as an application specific integrated circuit (ASIC), an embedded processor, a central processing unit associated with controller 302, etc. Processing unit 304 may be coupled with and/or otherwise configured to communicate, control, operate in conjunction with, and/or affect operation of one or more of communication unit 306 and/or memory unit 308 via one or more wired and/or wireless interconnections, such as any suitable number of data and/or address buses, for example. These interconnections are not shown in FIG. 3 for purposes of brevity.

For example, processing unit 304 may be configured to retrieve, process, and/or analyze data stored in memory unit 308, to store data to memory unit 308, to replace data stored in memory unit 308, to control various functions associated with illumination system 340, motion actuators/agitators 360, and/or imager 380, to analyze images or video frames captured by imager 380 and stored in memory unit 308 to identify the number and size of particles contained in the fluid of vessel being tested, etc. Additional details associated with such functions are further discussed below.

Communication unit 306 may be configured to support any suitable number and/or type of communication protocols to facilitate communications between controller 302 and one or more of illumination system 340, motion actuators/agitators 360, and/or imager 380. Communication unit 306 may be configured to facilitate the exchange of any suitable type of information between controller 302 and one or more of illumination system 340, motion actuators/agitators 360, and/or imager 380 (e.g., via links 320, 322, and/or 324), and may be implemented as any suitable combination of hardware and/or software to facilitate such functionality. For example, communication unit 306 may be implemented with any number of wired and/or wireless transceivers, modems, ports, input/output interfaces, connectors, antennas, etc.

In accordance with various embodiments, memory unit 308 may be a computer-readable non-transitory storage device that may include any suitable combination of volatile (e.g., a random access memory (RAM), or non-volatile memory (e.g., battery-backed RAM, FLASH, etc.). Memory unit 308 may be configured to store instructions executable on processing unit 304. These instructions may include machine readable instructions that, when executed by processing unit 304, cause processing unit 304 to perform various acts as described herein. Although the various functions of controller 302 are described herein in terms of execution of instructions stored in memory unit 308 via processing unit 304, it will be understood that equivalent functions may be realized exclusively via hardware components (e.g., circuit components) or hardware components (e.g., those implemented via communication unit 306) working in conjunction with processing unit 304 executing instructions stored in memory unit 308. Memory unit 308 may also be configured to store any other suitable data used in conjunction with visual inspection system 100, such as images or video frames captured by imager 380.

Control module 309 is a region of memory unit 308 configured to store instructions, that when executed by processing unit 304, cause processing unit 304 to perform various acts in accordance with applicable embodiments as described herein. In an embodiment, control module 309 includes instructions that, when executed by processing unit 304, cause processing unit 304 to transmit one or more commands to illumination system 340 (e.g., via link 320) to control the state of illumination system 340.

For example, illumination system 340 may include one or more light sources, such as light source 201, for example, as discussed above with reference to FIGS. 1-2. In some embodiments, the light source may be on continuously as each vessel is analyzed, and is not turned off when the stage 102 moves to test a new vessel. In other embodiments, the light source may be turned on and off in a manner that is synchronized to the agitation of the stage 102 and the images captured by imager 380, but is not varied with respect to different agitation profiles or other parameters such as different fluid volumes, vessel sizes, etc. For example, the light source may be turned on during the entire agitation profile and turned off while the stage 102 moves to align the next vessel for testing. Embodiments include processing unit 304 executing instructions stored in control module 309 to cause the light source included in illumination system 340 to turn on and off in such a manner.

Embodiments also include processing unit 304 executing instructions stored in control module 309 such that the light source may be turned on and off in a manner that is varied with respect to different agitation profiles or other parameters such as different fluid volumes, the viscosity of the fluid, the color of the fluid, etc. In other words, different agitation profiles may be stored in memory unit 308, which are executed for a particular plate 104 based upon the size of the vessel being tested and the characteristics of the fluid contained in the vessel. Additionally, image acquisition profiles may be stored in memory unit 308 that identify the time periods, during each agitation profile, when images are acquired for each vessel. For example, an agitation profile may specify an agitation period and a non-agitation period for a 96-well microplate. However, two different 96-well microplates may contain fluids having different characteristics (e.g., one fluid being a higher viscosity than another). Therefore, memory unit 308 may associate two different image acquisition profiles for the same agitation profile, with one being applied for one type of fluid being tested and the other image acquisition profile being applied for another type of fluid being tested.

Embodiments also include processing unit 304 executing instructions stored in control module 309 to change other parameters associated with the light source included in illumination system 340. For example, controller 302 may adjust the intensity of light output by the light source, set a wavelength or range of wavelengths used by the light source, etc.

Additionally, processing unit 304 may execute instructions stored in control module 309 to control the state of other components of visual inspection system 100. For example, controller 302 may read the current position of stage 102 and transmit one or more commands (e.g., via link 322) to a motor or other suitable actuator to move the stage 102 to a new location so that the next vessel 106 within the plate 104 may be tested. To provide another example, controller 302 may transmit one or more commands to a motor or other suitable actuator to move the axicon 202 included in the illumination system 340, the illumination system 304, and/or the stage 102 to adjust the physical location of various components and/or the optical characteristics with such components. For example, a particular modular illumination system 108 may be selected, a particular optical element may be identified and/or placed, a beam diameter of the source light be adjusted, the distance D may be ascertained, etc., as part of the image acquisition profile stored in memory unit 308 and associated with a particular tray being tested, as discussed above.

To facilitate the testing of different plate types and/or different fluid types, embodiments include controller 302 manually, automatically, or semi-automatically selecting an agitation profile and an image acquisition profile for a particular type of plate and/or fluid being tested. For example, a user may provide a user input to controller 302 (user interface not shown) to select an agitation profile and/or an image acquisition profile when a new type of plate and/or fluid needs to be tested. To provide another example, controller 302 may receive sensor data measurements from various sensors positioned on stage 102 (not shown) to identify the type of tray positioned on stage 102 from weight measurements, plate dimension measurements, vessel dimension measurements, etc. Once the plate type is identified (e.g., a 96-well or a 24-well microplate), processing unit 306 may then execute instructions stored in control module 309 to correlate a stored agitation profile and image acquisition profile to the identified plate type. In this way, visual inspection system 100 may automatically adapt the testing setup to different plate types as these different types of plates are detected.

Furthermore, processing unit 304 may execute instructions stored in control module 309 to control the operation of imager 380 (e.g., via link 324). That is, controller 302 may cause the imager 380 to acquire images in accordance with a particular image acquisition profile that is synchronized to the current agitation profile. For example, processing unit 304 may execute instructions stored in control module 309 to cause imager 380 to capture one or more images or video frames prior to an agitation period and after the agitation period (e.g., during a non-agitation period). These images may then be stored in memory unit 308 and analyzed to determine the size and number of particles suspended in a fluid contained within the vessel under test, as further discussed below.

Image analysis module 311 is a region of memory unit 308 configured to store instructions, that when executed by processing unit 304, cause processing unit 304 to perform various acts in accordance with applicable embodiments as described herein. In an embodiment, image analysis module 311 includes instructions that, when executed by processing unit 304, cause processing unit 304 to analyze one or more images and/or video frames acquired by imager 380 to determine the size and number of particles suspended in a fluid contained within the vessel under test.

In various embodiments, processing unit 304 may execute instructions stored in image analysis module 311 to perform image analysis of the images acquired via imager 380 in accordance with any suitable techniques, such as frame differencing, background subtraction, and/or or minimum intensity ("MinIP") techniques, for example. To provide another example, in an embodiment in which imager 380 is implemented as part of a plenoptic camera system, processing unit 304 may execute instructions stored in image analysis module 311 to identify the depth of the objects from a predetermine data set, and use this information to determine the amount of particles in an imaged well without necessarily performing background subtraction.

For example, imager 380 may capture a first image using the scattered light that is received as a result of any particles suspended in the fluid of the vessel being tested. However, other artifacts such as dust on the outside of the vessel or scratches may also cause the source light provided by the illumination system 340 to be scattered and, in turn, received by imager 380. Therefore, this first captured image may be a "background" image, which indicates the image of the vessel and the position of particles prior to agitation. Continuing this example, imager 380 may capture a second "analysis" image after stage 102 has been agitated, which shows a new position of the particles within the vessel as a result of their movement from the agitation. However, any light that is scattered as a result of artifacts will not change as a result of plate agitation. Therefore, processing unit 304 may execute instructions stored in image analysis module 311 to subtract the background image from the analysis image to generate a difference image, which effectively filters out static images. The difference image may then be analyzed to determine the number and size of particles suspended in the fluid.

To provide another example, a MinIP imaging technique may be implemented, in which case imager 380 may capture several images after plate agitation is complete. In particular, plate agitation may occur, resulting in movement of particles suspended in the vessel's fluid, and these particles may continue to move for some brief period of time after the agitation has stopped. Thus, several images may be captured after plate agitation has stopped, and a minimum intensity projection may be created using all (or some subset of) these captured images. In this way, although each of the acquired images may contain representations of static features such as scratches and dust, these features will not appear in the MinIP assuming that the particles have been sufficiently well agitated and the particles are mobile during image acquisition. In an embodiment, the MinIP may then be subtracted from all images in the image set (i.e., the acquired images used to create the MinIP) to generate an image stack, with bright features corresponding to particles. In this way, the number and/or size of particles in a vessel's fluid may then be characterized using the image stack.

Figure 4:
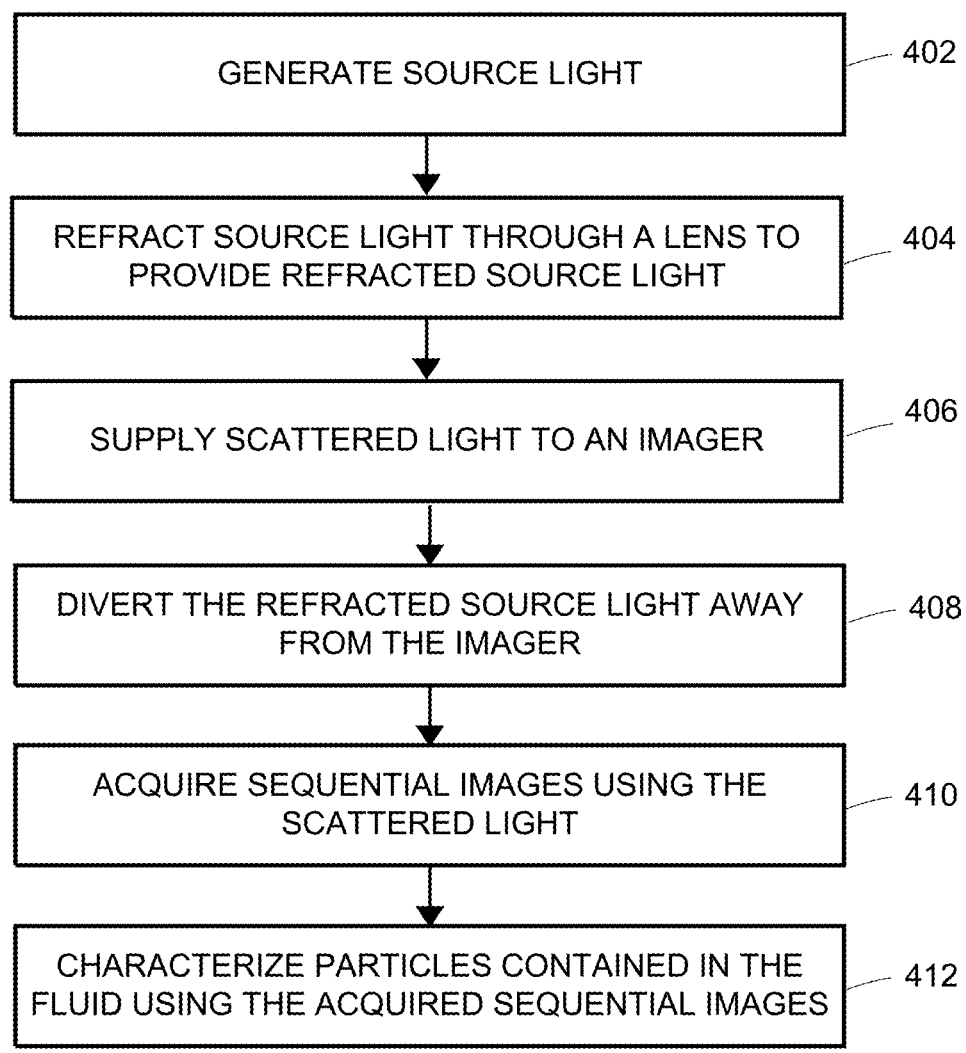
FIG. 4 illustrates an example of a method flow 400 for characterizing particles in a fluid, according to an embodiment of the present disclosure.

FIG. 4 illustrates an example of a method flow 400 for characterizing particles in a fluid, according to an embodiment of the present disclosure. In various embodiments, one or more regions of method 400 (or the entire method 400) may be implemented by any suitable device. For example, one or more regions of method 400 may be performed by controller 302, illumination system 340, and/or imager 380, as shown in FIG. 3. Method 400 represents the various steps performed during the testing of a single vessel, which may be repeated for each vessel within a plate (e.g., plate 104, as shown in FIG. 1).

Method 400 may begin by generating source light (block 402). This may include, for example, controller 302 causing a light source (e.g., light source 201, as shown in FIG. 2) to turn on and illuminate a vessel being tested (block 402). This may also include, for example, the light source generating light in a default state (e.g., in a continuous manner) (block 402).

Method 400 may include refracting the source light through one or more optical elements to provide refracted source light (block 404). This may include, for example, directing the source light through an axicon to refract the source light, as shown in FIG. 2 (block 404). Method 400 may also include directing the refracted source light into the fluid contained in the vessel under test (block 404).

Method 400 may include supplying scattered light to an imager (e.g., imager 112, as shown in FIG. 1) as a result of an interaction between the refracted source light and particles suspended in the fluid (block 406). This may include, for example, the refracted source light being directed into the vessel at an angle (i.e., not directly from the top of the vessel) to cause particles in the fluid to scatter the refracted source light, which is then supplied to the imager (block 406). The refracted source light may also be diverted away from the imager (block 408).

Method 400 may include acquiring sequential images using the scattered light (block 410). This may include, for example, the imager acquiring a background image before the vessel under test is agitated and an analysis image after the vessel has been agitated (block 410). This may also include, for example, storing the background image and the analysis image in a memory (e.g., memory unit 308) (block 410).

Method 400 may include characterizing particles contained in the fluid using the acquired sequential images (block 412). This may include, for example, generating a difference image by subtracting the background image (block 410) from the analysis image (block 410) to produce a difference image (block 412). Method 400 may include determining a size and number of particles contained in the fluid based upon an analysis of this difference image (block 412).

Figure 5:
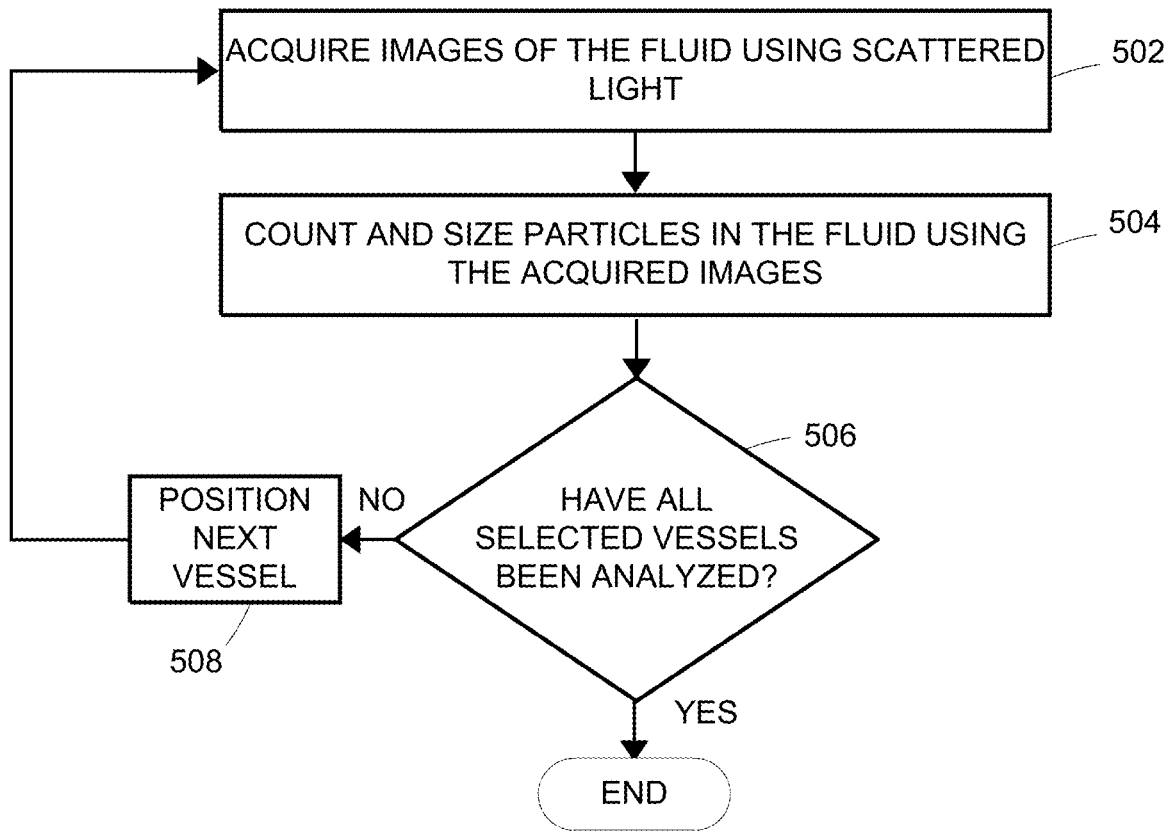
FIG. 5 illustrates an example of a method flow 500 for characterizing particles in a fluid, according to an embodiment of the present disclosure.

FIG. 5 illustrates an example of a method flow 500 for characterizing particles in a fluid, according to an embodiment of the present disclosure. In various embodiments, one or more regions of method 500 (or the entire method 500) may be implemented by any suitable device. For example, one or more regions of method 500 may be performed by controller 302, illumination system 340, and/or imager 380, as shown in FIG. 3. Method 500 represents the various steps performed for iteratively testing several vessels within a plate (e.g., plate 104, as shown in FIG. 1).

Method 500 may begin by acquiring images of the fluid using scattered light (block 502). This may include, for example, controller 302 causing an imager (e.g., imager 112 as shown in FIG. 1) to capture an image of the fluid in the vessel being tested using scattered light before and after plate agitation, which is received by the imager (block 502). This may also include, for example, controller 302 causing an imager (e.g., imager 112 as shown in FIG. 1) to capture several images of the fluid in the vessel being after plate agitation in accordance with MinIP imaging techniques, which is received by the imager (block 502). Again, this scattered light may be the result of refracted source light (e.g., from a light source 201 in conjunction with axicon 202, as shown in FIG. 2) interacting with particles suspended in the vessel's fluid, whereas the refracted source light itself is diverted away from the imager (block 502). Method 500 may also include storing the acquired images in a suitable memory (e.g., memory unit 308, as shown in FIG. 3) (block 502).

Method 500 may include counting and sizing the particles using the acquired images image (block 504). This may include, for example, performing any suitable type of image analysis on the images to identify the overall number of particles suspended in the fluid and the size of these particles (block 504). For example, the image analysis may be performed in accordance with the imaging techniques described herein with respect to FIG. 3 (block 504). Method 500 may also include storing the result of this analysis in a suitable memory (e.g., memory unit 308, as shown in FIG. 3) (block 504).

Once the particles in the vessel's fluid have been sized and counted (block 504), method 500 may include determining whether all vessels selected for analysis have been analyzed (block 506). This determination may be made, for example, by tracking the overall number of vessels that have been analyzed for a given type of plate, which has a known number of vessels (e.g., 24 or 96), and determining if this count is less than or equal to the overall number of vessels (block 506). This determination may also be made, for example, by a user entering any suitable number of vessels for analysis (which may be less than all vessels in the plate), tracking the overall number of vessels that have been analyzed, and determining if this count is less than or equal to the entered number of vessels being tested (block 506). In any event, if additional vessels need to be analyzed, then method 500 continues (block 508). However, if the analyzed vessel is the last vessel to be analyzed, then method 500 ends. Upon ending, method 500 may include storing or outputting a report (e.g., in memory unit 308, as shown in FIG. 3) of the analysis of each vessel, which may include the number and size of particles contained in the fluid in each vessel. Once this report is completed, a user may view the report and/or start the process over with a new plate.

In the event that additional vessels need to be analyzed, method 500 may include positioning the next vessel for analysis (block 508). This may include, for example, a controller (e.g., controller 302, as shown in FIG. 3) causing one or more actuators and/or motors to move the stage (e.g., stage 102, as shown in FIG. 1) in the x- and/or y-axes to align the next vessel to be tested with the illumination system (e.g., illumination system 108) (block 508). This may also include, for example, a controller causing one or more actuators and/or motors to move the illumination system (e.g., illumination system 108) in the x- and/or y-axes to align the next vessel to be tested with the illumination system (block 508).

In any event, once the next vessel is positioned (block 508), method 500 may repeat the process of acquiring images of the fluid contained in this new vessel (block 502). Thus, method 500 is restarted to count and size the particles in the new vessel. In this way, method 500 may iteratively analyze any suitable number of vessels to determine the number and size of particles contained in the fluid of each analyzed vessel.

Figure 6:
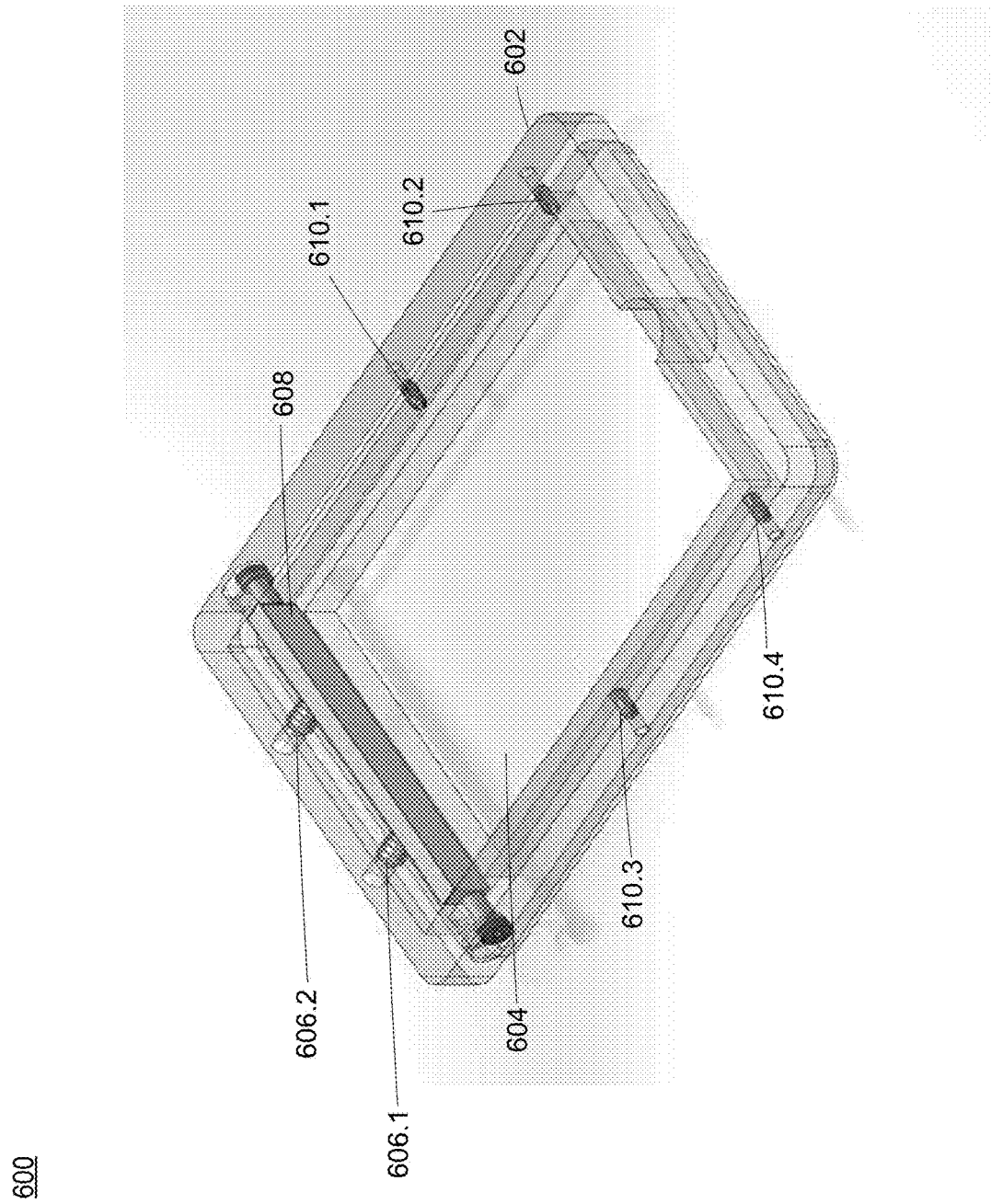
FIG. 6 illustrates an example plate holder 600 for receiving a plate containing vessels having fluid to be imaged.

FIG. 6 illustrates an example plate holder 600 for receiving a plate containing vessels having fluid to be imaged. In an embodiment, plate holder 600 is an implementation of plate holder 105, as shown and discussed above with reference to FIG. 1. Again, the plate holder 600 shown in FIG. 6 is an example of one type of plate holder that may be implemented, and may include more, less, or alternate components. For example, although plate holder 600 is shown in FIG. 6 as including two springs 606.1-606.2 and four spring plungers 610.1-610.4, embodiments include plate holder 600 having any suitable number and/or type of springs and spring plungers.

In an embodiment, plate holder 600 provides quick and consistent alignment of vessels with the imaging components of a visual inspection system. To do so, plate holder 600 includes a main housing 602, which forms a cavity 604 that is shaped to accept a plate having a particular size and shape (e.g., plate 104). Using visual inspection system 100 as an example, once the plate 104 is installed into the plate holder 600, the plate 104 is disposed on the stage 102 such that testing of the fluid contained in each vessel 106 can begin, as shown in FIG. 1.

To facilitate consistent alignment of plates, the plate holder 600 also includes springs 606.1-606.2, which are mounted within the housing 602 so as to apply pressure to sliding spring-loaded wall 608 as the springs 606.1-606.2 are compressed. To install a plate into plate holder 600, an operator presses the side of the plate against sliding spring-loaded wall 608 while loading the plate, which compresses the springs 606.1-606.2 and allows the plate to be placed into the cavity 604.

Moreover, plate holder 600 includes four spring plungers 610.1-610.4, which are also threaded or otherwise mounted to the housing 602. Although not shown in FIG. 6 for purposes of brevity, embodiments include each of the spring plungers 610.1-610.4 being implemented with a spring-loaded plunger that slightly compresses. This plunger material may be made of rubber or other suitable flexible materials to facilitate holding the plate in place. Furthermore, in embodiments in which the spring plungers 610.1-610.4 are threaded into the housing 602, the spring plungers 610.1-610.4 may be threaded into the housing 602 by an amount that ensures the proper fit of an installed plate. Thus, once the plate in installed into the cavity 604 via compression of the sliding spring-loaded wall 608, the four threaded spring plungers 610.1-610.4 function to provide a second snap fit and hold the plate firmly in place during plate agitation. When unloading the plate, the operator may then further compress the sliding spring-loaded wall 608 slightly and lift out the plate.

Continuing to use visual inspection system 100 as an example, once the plate 104 is placed into plate holder 600, each vessel 106 is properly aligned with illumination system 108, imager 112, and optional optical system 110 as the stage 102 moves with respect to these components. Thus, plate holder 600 ensures proper and consistent imaging of the fluid contained in each of vessels 106, with each vessel appearing in the same field of view during image analysis. Because visual inspection system 100 may be utilized to test several plates, plate holder 600 also ensures uniform alignment and positioning of vessels among different trays that are placed into and removed from plate holder 600. In this way, plate holder 600 provides a convenient solution that allows a user to load and unload plates without requiring pre-alignment checks before starting each plate's test run, thereby allowing for tests to be performed in a more efficient manner.

Some of the Figures described herein illustrate example block diagrams having one or more functional components. It will be understood that such block diagrams are for illustrative purposes and the devices described and shown may have additional, fewer, or alternate components than those illustrated. Additionally, in various embodiments, the components (as well as the functionality provided by the respective components) may be associated with or otherwise integrated as part of any suitable components. For example, the controller 302 may be integrated with the illumination system 340 or the imager 380.

Embodiments of the disclosure relate to a non-transitory computer-readable storage medium having computer code thereon for performing various computer-implemented operations. The term "computer-readable storage medium" is used herein to include any medium that is capable of storing or encoding a sequence of instructions or computer codes for performing the operations, methodologies, and techniques described herein. The media and computer code may be those specially designed and constructed for the purposes of the embodiments of the disclosure, or they may be of the kind well known and available to those having skill in the computer software arts. Examples of computer-readable storage media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as ASICs, programmable logic devices ("PLDs"), and ROM and RAM devices.

Examples of computer code include machine code, such as produced by a compiler, and files containing higher-level code that are executed by a computer using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote computer (e.g., a server computer) to a requesting computer (e.g., a client computer or a different server computer) via a transmission channel. Another embodiment of the disclosure may be implemented in hardwired circuitry in place of, or in combination with, machine-executable software instructions.

As used herein, the singular terms "a," "an," and "the" may include plural referents unless the context clearly dictates otherwise.

As used herein, relative terms, such as "above," "below," "up," "left," "right," "down," "top," "bottom," "vertical," "horizontal," "side," "higher," "lower," "upper," "over," "under," "inner," "interior," "outer," "exterior," "front," "back," "upwardly," "lower," "downwardly," "vertical," "vertically," "lateral," "laterally" and the like refer to an orientation of a set of components with respect to one another; this orientation is in accordance with the drawings, but is not required during manufacturing or use.

As used herein, the terms "connect," "connected," and "connection" refer to an operational coupling or linking. Connected components can be directly or indirectly coupled to one another, for example, through another set of components.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, technique, or process to the objective, spirit and scope of the present disclosure. All such modifications are intended to be within the scope of the claims appended hereto. While the techniques disclosed herein have been described with reference to particular operations performed in a particular order, it will be understood that these operations may be combined, sub-divided, or re-ordered to form an equivalent technique without departing from the teachings of the present disclosure. Accordingly, unless specifically indicated herein, the order and grouping of the operations are not limitations of the present disclosure.

What is claimed is:

1. A system comprising:
a light source configured to generate source light that is incoherent;
an optical element that is separate from the light source and is disposed between the light source and a vessel containing a fluid that substantially occupies three dimensions, the optical element being configured to:
refract the source light to produce refracted source light; and
direct the refracted source light through the fluid contained in the vessel to produce scattered light as a result of an interaction between the refracted source light and particles suspended in the fluid, wherein the optical element is configured to refract the source light such that, once the refracted source light has passed through the fluid contained within the vessel, the refracted source light does not impinge upon an imager that is configured to acquire images using the scattered light, and wherein the light source and the imager are positioned such that, but for the optical element refracting the source light, the source light would impinge upon the imager; and one or more processors configured to perform image analysis on the acquired images to determine a size and a number of particles in the fluid.

2. The system of claim 1, wherein the optical element is an axicon.

3. The system of claim 1, wherein the light source is a light emitting diode (LED).

4. The system of claim 1, further comprising a stage configured to receive a plate including the vessel containing the fluid, wherein the stage is configured to selectively agitate, and wherein the imager is configured to acquire a first image prior to the stage being agitated and a second image after the stage is agitated.

5. The system of claim 1, further comprising a stage configured to receive a plate including the vessel containing the fluid, wherein:
the stage is configured to selectively agitate, and
the imager is configured to acquire a plurality of images after the stage is agitated; and
the one or more processors are further configured to generate a minimum intensity projection (MinIP) from the plurality of images, to subtract the Min IP from each of the plurality of images to generate an image stack, and to determine the size and the number of particles in the fluid from the image stack.

6. The system of claim 1, further comprising a stage configured to receive a plate including the vessel containing the fluid, wherein:
the vessel is from among a plurality of vessels included in the plate,
the one or more processors are further configured to determine the size and the number of particles in each of the plurality of vessels included in the plate, and
the stage further includes a plate holder configured to selectively receive and release the plate, the plate holder being further configured to hold the plate in the stage and to maintain each vessel from among the plurality of vessels in the same field of view with respect to one another while the one or more processors identify the size and the number of particles in each of the plurality of vessels included in the plate.

7. The system of claim 1, wherein the vessel is configured to hold a volume of fluid up to 200 microliters.

8. The system of claim 1, further comprising:
an optical system configured to direct the scattered light to the imager.

9. A system comprising:
a light-emitting diode (LED) light source configured to generate source light that is incoherent;
an axicon disposed between the LED light source and a vessel containing fluid that substantially occupies three dimensions, the axicon being configured to refract the source light to produce refracted source light,
wherein the axicon is configured to refract the source light such that (i) the refracted source light interacts with particles suspended in the fluid contained in the vessel to produce scattered light that is directed into a mirror, while (ii) the refracted source light, upon passing through the fluid contained within the vessel, does not impinge upon the mirror;

an imager configured to acquire sequential images using the scattered light that is reflected off the mirror, wherein the LED light source, the mirror, and the imager are positioned such that, but for the axicon refracting the source light, the source light would impinge upon the imager after reflecting off the mirror; and one or more processors configured to perform image analysis on the acquired sequential images to determine a size and a number of particles in the fluid.

10. The system of claim 9, further comprising a stage configured to selectively agitate and to receive a plate including the vessel, wherein the sequential images include a background image and an analysis image, the background image being acquired prior to the stage being agitated, and the analysis image being acquired after the stage is agitated.

11. The system of claim 10, wherein the background image and the analysis image are associated with the fluid being viewed from an underside of the vessel.

12. The system of claim 9, further comprising a stage configured to selectively agitate and to receive a plate including the vessel, wherein the imager is configured to acquire the sequential images after the stage is agitated, and
wherein the one or more processors are further configured to generate a minimum intensity projection (MinIP) from the sequential images, to subtract the MinIP from each of the sequential images to generate an image stack, and to determine the size and the number of particles in the fluid from the image stack.

13. The system of claim 9, further comprising a stage configured to selectively agitate and to receive a plate including the vessel, wherein the plate has a 96-well standard format including 96 vessels.

14. The system of claim 9, further comprising a stage configured to selectively agitate and to receive a plate including the vessel, wherein:
the vessel is from among a plurality of vessels included in the plate,
the one or more processors are further configured to determine the size and the number of particles in each of the plurality of vessels included in the plate, and
the stage further includes a plate holder configured to selectively receive and release the plate, the plate holder being further configured to hold the plate in the stage and to maintain each vessel from among the plurality of vessels in the same field of view with respect to one another while the one or more processors identify the size and the number of particles in each of the plurality of vessels included in the plate.

15. The system of claim 9, wherein the vessel is configured to hold a volume of fluid up to 200 microliters.

16. The system of claim 9, wherein the axicon is configured such that the sequential images acquired by the imager using the scattered light reflected off the mirror have a depth of field corresponding to the entire volume of fluid contained in the vessel.

17. A method for calculating a size and a number of particles in a fluid contained in a vessel, the fluid contained within the vessel substantially occupying three dimensions, comprising:
generating, via a light source, source light that is incoherent;

refracting, via an optical element that is separate from the light source and is disposed between the light source and the vessel, the source light to produce refracted source light;

supplying, via an optical system, scattered light to an imager as a result of an interaction between the refracted source light and particles suspended in the fluid, wherein the optical element, is configured to refract the source light such that, once the refracted source light has passed through the fluid contained within the vessel, the refracted source light does not impinge upon the imager, and wherein the light source and the imager are positioned such that, but for the optical element refracting the source light, the source light would impinge upon the imager;

acquiring, via the imager, sequential images using the supplied scattered light; and performing image analysis on the acquired sequential images, via one or more processors, to determine a size and a number of particles in the fluid.

18. The method of claim 17, wherein the vessel is included in a plate placed on a stage, and the method further comprising:

agitating the plate, and wherein the act of acquiring the sequential images using the scattered light comprises:

acquiring a first image prior to the plate being agitated; and acquiring a second image after the plate is agitated.

19. The method of claim 17, wherein the act of determining the size and the number of particles in the fluid using the sequential images includes subtracting, via the one or more processors, the first image from the second image to provide a difference image, and determining the size and the number of particles in the fluid by analyzing the difference image.

20. The method of claim 17, wherein the vessel is included in a plate placed on a stage, wherein the act of acquiring the sequential images includes acquiring the sequential images after the plate is agitated, and wherein the act of determining the size and the number of particles in the fluid using the sequential images includes generating a minimum intensity projection (MinIP) from the sequential images, subtracting the MinIP from each of the sequential images to generate an image stack, and determining the size and the number of particles in the fluid from the image stack.

* * * * *